INVENTOR
DANIEL F. STEINER
BY
Andrus & Starke
Attorneys

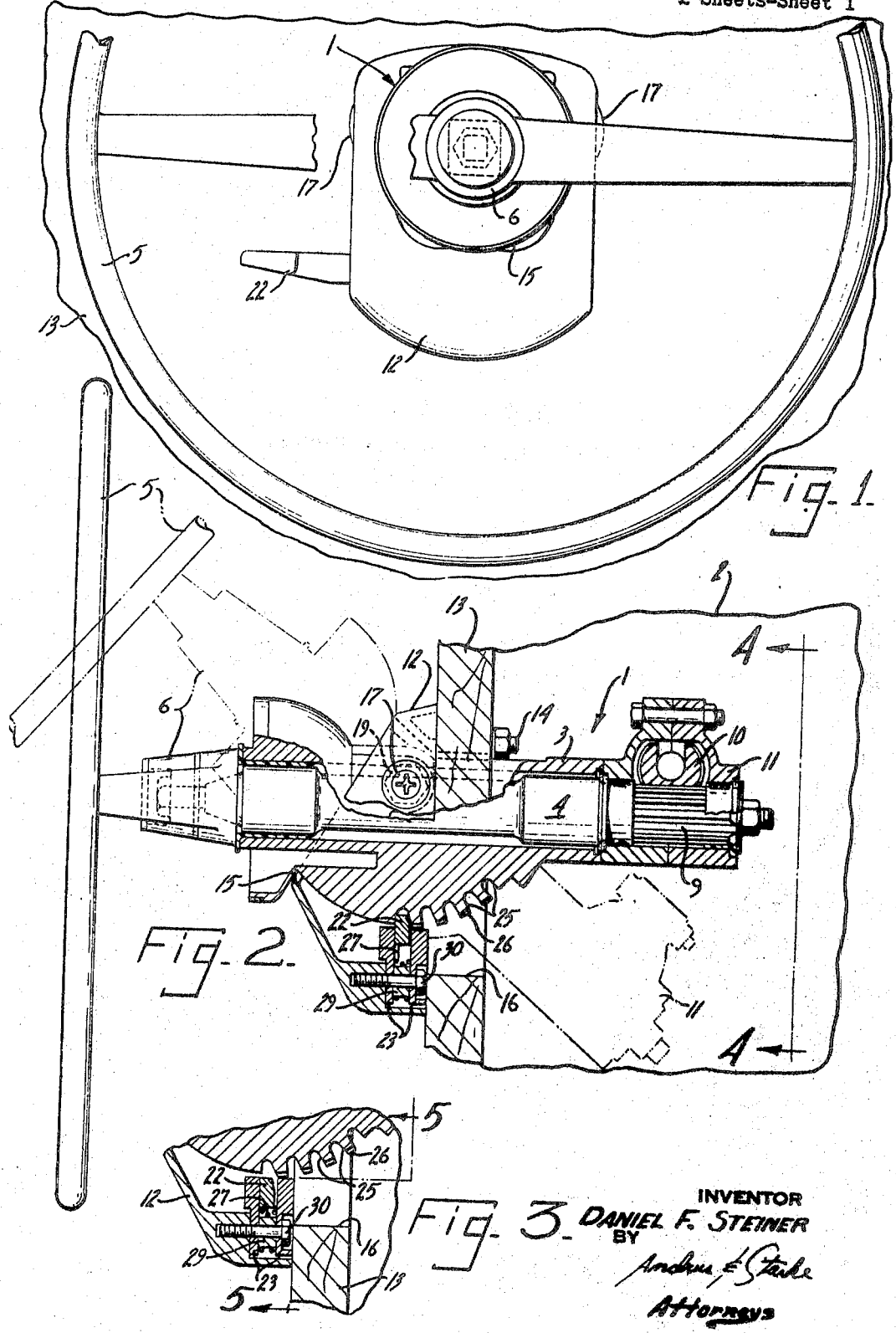

United States Patent Office 3,487,712
Patented Jan. 6, 1970

3,487,712
STEERING CONTROL MEANS FOR WATERCRAFT
Daniel F. Steiner, Fond du Lac, Wis., assignor to Brunswick Corporation, Chicago, Ill., a corporation of Delaware
Filed Sept. 25, 1967, Ser. No. 670,172
Int. Cl. B62d 1/19; G05g 5/06
U.S. Cl. 74—493                2 Claims

ABSTRACT OF THE DISCLOSURE

A steering wheel assembly for watercraft is pivotally supported for tilt movement about a transverse axis through a given range in a generally vertical plane from a mounting bracket assembly adapted for securement to a dashboard or the like. The steering wheel assembly includes a notched quadrant on a given radius from the tilt axis of the wheel assembly and which is engageable by a locking lever pivotally mounted on the bracket assembly and biased into locking engagement with the notched quadrant.

---

This invention relates to steering control means for watercraft and more particularly to an adjustable steering wheel assembly.

The usage of a steering wheel assembly for controlling the rudder or drive unit for watercraft has become commonplace. Generally such a steering wheel assembly is mounted through a dashboard or other support therefor within the watercraft at a remote opeartor's station and is not adjustable. Lacking adjustability, the steering wheel may be in an uncomfortable position for manipulation by the operator and may make entry to and exit from the operator's station somewhat difficult.

In known arrangements providing for adjustability of the steering wheel assembly in a vertical plane, tools are generally required to secure the assembly in a position of adjustment. Under these circumstances an adjustment is time-consuming and the tendency is to make an initial adjustment to best advantage which then in effect becomes a more or less fixed position for the steering wheel. The position of best advantage for comfortable manipulation of the steering wheel by the operator may not, however, enhance ease of entry to or exit from the operator's station.

It is generally an object of this invention to provide a steering wheel assembly which is adjustable to select positions within a given range in a vertical plane, and wherein the lock means for securing the assembly in any selected position is manually operable with relative ease so that an operator will not hesitate to make a readjustment of the assembly if he so desires or to move the assembly to a position allowing entry to or exit from the operator's station with relative ease.

According to the invention, the steering wheel assembly is pivotally supported on a transverse horizontal axis for movement in a vertical plane by a mounting bracket assembly adapted for securement to a dashboard or other suitable support structure. At a given radius from the pivot axis, the steering wheel assembly is provided with a plurality of circumferentially spaced transversely extending serrations or recesses which are selectively engageable by a locking lever one end of which is pivotally secured to the mounting bracket assembly. The locking lever is normally biased into locking engagement with the steering wheel assembly and is adapted for manual manipulation to effect a disengagement from the serrations or recesses to permit adjustment of the assembly.

The drawings furnished herewith illustrate the best mode of carrying out the invention as presently contemplated and set forth hereinafter.

Figure 4:
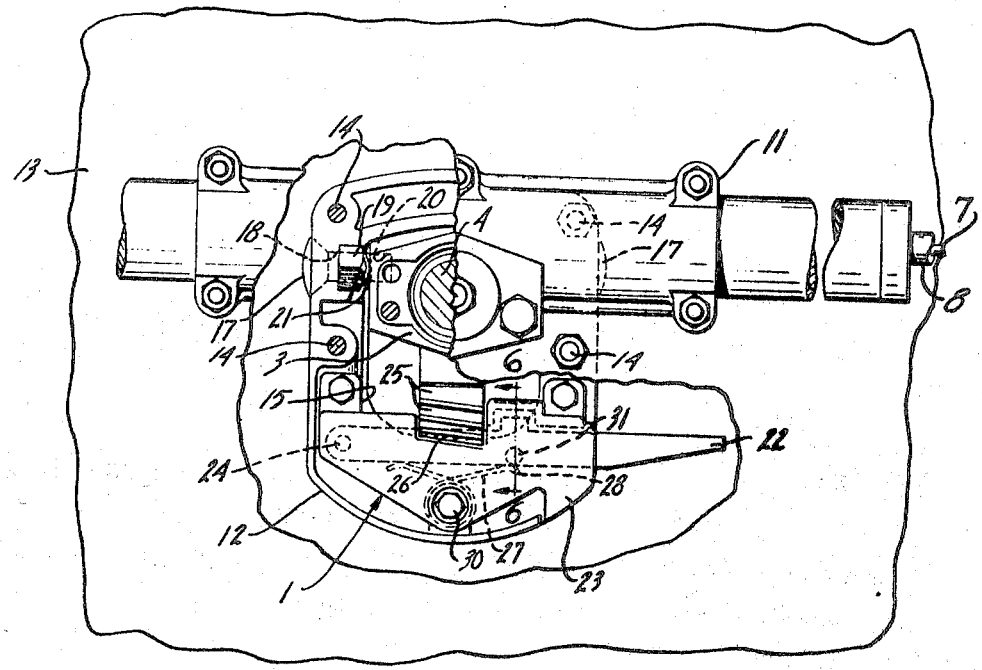
Figure 5:
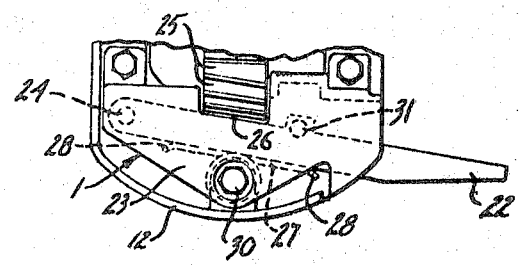
Figure 6:
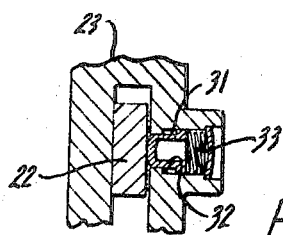

In the drawings:
FIGURE 1 is a partial front elevation of the steering wheel assembly of this invention;
FIG. 2 is a side elevation of the steering wheel assembly with portions broken away and sectioned and in a given position of adjustment, phantom lines show the assembly in another possible position of adjustment;
FIG. 3 is a detail section showing the locking lever disengaged from the steering wheel assembly so that the latter becomes moveable for readjustment;
FIG. 4 is a view taken generally on line 4—4 of FIG. 2 with parts broken away and sectioned;
FIG. 5 is a view taken generally on line 5—5 of FIG. 3; and
FIG. 6 is an enlraged detail section taken generally on line 6—6 of FIG. 4.

Referring to the drawings, the steering wheel assembly 1 of this invention for controlling a rudder or drive unit, not shown, of a watercraft 2, shown only in part, includes a tubular member or steering column 3 having the steering shaft 4 rotatably disposed therein. The shaft 4 is turned within the column 3 by means of the steering wheel 5, the hub 6 of which is secured on the end of the shaft at the operator's station.

The steering wheel assembly 1 further includes means for actuating the reciprocally movable member 7 of a flexible push-pull cable 8, the remote end of which is operatively connected to the rudder or drive unit. The actuating means for cable 8 includes a pinion 9 secured on the end of shaft 4 oppositely from the steering wheel 5. The pinion 9 is rotatable with the shaft 4 to reciprocally drive the rack 10 meshingly engaged with the pinion within the transversely extending housing 11 secured onto the corresponding end of the steering column 3. The rack 10 carries the movable member 7 of cable 8 and is reciprocally driven within housing 11 in accordance with manipulation of steering wheel 5 to directionally control the rudder or drive unit.

A mounting bracket assembly 12 supports the steering wheel assembly 1 for pivotal tilt movement about a transverse axis through a given range in a generally vertical plane. The bracket assembly 12 is secured to a supporting structure such as the transversely extending dashboard 13 of the watercraft 2 by means of stud bolts 14 and has an opening 15 therein generally aligned with an opening 16 in the dashboard. The steering wheel assembly 1 extends through and is suspended in the aligned openings 15 and 16 between a pair of opposed transversely extending and aligned spindles 17 which project inwardly from opposed wall portions of the bracket assembly 12 adjacent to opening 15. The spindles 17 extend through transversely and axially aligned holes 18 in the bracket assembly 12 and have an intermediate threaded portion threadedly engaged by nuts 19 to secure the spindles relative to the bracket assembly. The spindles 17 project inwardly of nuts 19 and engage into corresponding outwardly opening bearing holes 20 on opposed sides of steering column 3 for the pivotal support of the steering wheel assembly 1 in the aligned openings 15 and 16. A wave washer 21 is disposed on each spindle 17 between the respective nuts 19 and the steering wheel assembly 1 to minimize side play in the transverse direction and impose a measure of frictional resistance to the tilt movement of the steering wheel assembly.

Means are provided for locking the steering wheel assembly 1 in any one of a plurality of positions in the range of tilt adjustment. The locking means comprise a transversely extending lever 22 disposed beneath the steering wheel assembly 1 and generally in the vertical plane of the tilt axis for that assembly. Lever 22 is disposed in a transversely extending housing 23 forming a part of the mounting bracket assembly 12 and is pivotally movable in a generally vertical plane about the pin 24 at one end of housing 23. The end of lever 22 oppositely from its pivotal connection at 24 projects outwardly through an open end of housing 23 and is disposed for manipulation to the operator's left as generally shown in FIG. 1.

An intermediate portion of lever housing 23 is open upwardly and a corresponding portion of the lever 22 is engageable within any one of a plurality of equiangularly spaced recesses or notches 25 opening outwardly from the arcuate segment or quadrant 26 projecting downwardly from steering column 3 and disposed on a given radius from the tilt axis of the steering wheel assembly 1 to lock the wheel assembly relative to the mounting bracket assembly 12. Lever 22 is normally maintained in locked engagement with any one of the notches 25 by the coil spring 27 disposed beneath the lever and having opposed ends 28 which bias the lever upwardly. The spring 27 is disposed around an annular housing spacer element 29 secured within the lever housing 23 by the threaded member 30. The spring 27 together with the spacer element 29 serve as a stop for the lever 22 when the latter is manipulated to the unlocked position. The detent button 31 projects through an opening 32 in the wall of the lever housing 23 and is biased into engagement with the lever 22 by the spring 33 to prevent rattling by the lever within the housing.

Provided with a steering wheel mounting made in accordance with this invention, the operator of a watercraft can readily adjust or readjust the steering wheel position at any time. A simple manipulation of lever 22 to the unlocked position with one hand makes it possible for the other hand on the steering wheel 5 to move the assembly 1 as desired without loss of steering control when underway. At dockside the ease for tilting the steering wheel 5 will also be appreciated as the wheel is readily moved to a position making for greater ease of entry to and exit from the operator's station.

I claim:
1. In a steering wheel mounting for a watercraft having a transversely extending dashboard or the like, a mounting bracket secured to the dashboard, a steering wheel assembly pivotally supported by the mounting bracket on a transverse horizontal axis for tilt adjusting movement through a given range in a generally vertical plane, said assembly having an arcuate segment disposed at a given radius from the tilt adjusting axis with said segment having a plurality of spaced transverse notches opening outwardly, a transversely extending lever having one end thereof pivotally connected to the mounting bracket to one side of the arcuate segment and on an axis transverse to a plane through the pivot axis for the steering wheel assembly, the opposite end of the lever projecting from the mounting bracket on the opposite side of said arcuate segment and defining a handle, said lever having a central portion intermediate said ends disposed in opposed relation to said arcuate segment and being selectively engageable within said notches, and means biasing said lever into locking engagement within said notches, said lever being manually disengageable from said notches against said biasing means to provide for tilt adjusting movement of the steering wheel assembly to position the steering wheel as desired.

2. In a steering wheel mounting for a watercraft having a transversely extending dashboard or the like, a mounting bracket secured to the dashboard and having an opening therein generally aligned with an opening in the dashboard, a steering wheel assembly extending through said aligned openings and being pivotally supported on a transverse axis by a pair of opposed, transversely extending and aligned spindles secured to the mounting bracket, said spindles supporting the steering wheel assembly in said aligned openings for tilt adjusting movement through a given range in a generally vertical plane, an arcuate segment integral with and disposed beneath the steering wheel assembly in the plane of tilt adjusting movement, said segment being disposed at a given radius from the tilt adjusting axis and having a plurality of equiangularly spaced transverse notches opening downwardly, a transversely extending lever disposed generally in the vertical plane of the tilt adjusting axis, one end of said lever being pivotally connected to the mounting bracket on an axis transverse to the vertical plane of the pivot axis for the steering wheel assembly with the other end of said lever projecting from the mounting bracket for manual manipulation, said lever having a central portion intermediate said ends disposed beneath said arcuate segment and being selectively engageable within said notches, and means biasing said lever upwardly into locking engagement within said notches, said lever being manually disengageable from said notches against said biasing means to provide for tilt adjusting movement of the steering wheel assembly to position the steering wheel as desired.

References Cited

UNITED STATES PATENTS

| 702,980 | 6/1902 | Maxim | 74—493 |
| 2,826,090 | 3/1958 | Grinnell et al. | 74—493 |
| 3,199,625 | 8/1965 | Liebreich. | |

MILTON KAUFMAN, Primary Examiner

U.S. Cl. X.R.

74—534